(12) United States Patent
Bauer et al.

(10) Patent No.: US 7,315,832 B2
(45) Date of Patent: Jan. 1, 2008

(54) ONLINE BIDDING SYSTEM

(75) Inventors: David L. Bauer, Benicia, CA (US);
 Aaron J. Adair, Fairfield, CA (US)

(73) Assignee: Copart, Inc., Fairfield, CA (US)

( * ) Notice: Subject to any disclaimer, the term of this patent is extended or adjusted under 35 U.S.C. 154(b) by 51 days.

(21) Appl. No.: 10/627,547

(22) Filed: Jul. 25, 2003

(65) Prior Publication Data

US 2005/0021444 A1    Jan. 27, 2005

Related U.S. Application Data

(60) Provisional application No. 60/479,716, filed on Jun. 18, 2003.

(51) Int. Cl.
 *G06Q 40/00* (2006.01)
(52) U.S. Cl. .......................... 705/26; 705/37
(58) Field of Classification Search ................ 705/36, 705/26, 37
 See application file for complete search history.

(56) References Cited

U.S. PATENT DOCUMENTS

| | | | |
|---|---|---|---|
| 4,412,287 A | 10/1983 | Braddock, III | |
| 4,789,928 A | 12/1988 | Fujisaki | |
| 5,818,914 A | 10/1998 | Fujisaki | |
| 5,835,896 A * | 11/1998 | Fisher et al. | 705/37 |
| 5,835,898 A | 11/1998 | Fisher et al. | |
| 5,890,138 A * | 3/1999 | Godin et al. | 705/26 |
| 6,012,045 A | 1/2000 | Barzilai et al. | |
| 6,023,685 A | 2/2000 | Brett et al. | |
| 6,044,383 A | 3/2000 | Mori et al. | |
| 6,055,514 A | 4/2000 | Wren | |

(Continued)

FOREIGN PATENT DOCUMENTS

CA    2329281    *  6/2002

(Continued)

OTHER PUBLICATIONS

Art Warbelow and Jiro Kozurto, "Aucnet: TV Auction Network System," Harvard Business School Article, Jul. 19, 1989, Publishing Division, Harvard Business School, Boston, Massachusetts.

(Continued)

*Primary Examiner*—Jagdish N Patel
(74) *Attorney, Agent, or Firm*—Steven L. Nichols; Rader, Fishman & Grauer PLLC (57) ABSTRACT

An online auction system comprising a preliminary bidding portion and a virtual auction portion is disclosed herein. The preliminary bidding portion allows bidders to access auction items and input bids during a preestablished extended period of time. After the preliminary bidding portion concludes, the virtual auction portion provides bidders the opportunity to input bids on each item consecutively and individually from the preliminary auction portion in a manner similar to a conventional live auction. During the virtual auction portion, bidders are provided with a countdown to encourage further bidding before the previous bid becomes final. After each new bid is inputted, the countdown is reinitiated. The countdown is reinitiated until no new bids are input. An alert system notifies bidders that a particular item of interest is about to be offered for bid as part of the virtual auction portion. The system also provides bidders means for inputting proxy bids.

15 Claims, 5 Drawing Sheets

U.S. PATENT DOCUMENTS

| | | | |
|---|---|---|---|
| 6,058,379 A * | 5/2000 | Odom et al. .................. | 705/37 |
| 6,161,099 A | 12/2000 | Harrington et al. | |
| 6,216,114 B1 * | 4/2001 | Alaia et al. .................. | 705/37 |
| 6,230,146 B1 | 5/2001 | Alaia et al. | |
| 6,243,691 B1 | 6/2001 | Fisher et al. | |
| 6,366,899 B1 | 4/2002 | Kernz | |
| 6,368,891 B1 | 4/2002 | Feinberg | |
| 6,415,269 B1 * | 7/2002 | Dinwoodie .............. | 705/36 R |
| 6,415,270 B1 | 7/2002 | Rackson et al. | |
| 6,449,601 B1 | 9/2002 | Friedland et al. | |
| 6,519,570 B1 | 2/2003 | Faber et al. | |
| 6,564,192 B1 | 5/2003 | Kinney, Jr. et al. | |
| 6,606,607 B1 | 8/2003 | Martin et al. | |
| 6,609,112 B1 | 8/2003 | Boarman et al. | |
| 6,647,373 B1 | 11/2003 | Carlton-Foss | |
| 6,665,649 B1 | 12/2003 | Megiddo | |
| 6,671,674 B1 | 12/2003 | Anderson et al. | |
| 7,024,376 B1 * | 4/2006 | Yuen ........................... | 705/26 |
| 2001/0021923 A1 | 9/2001 | Atkinson et al. | |
| 2001/0037281 A1 * | 11/2001 | French et al. ................ | 705/37 |
| 2002/0016743 A1 * | 2/2002 | Dorr ........................... | 705/26 |
| 2002/0032834 A1 | 3/2002 | Abrams et al. | |
| 2002/0082971 A1 | 6/2002 | Le et al. | |
| 2002/0103740 A1 | 8/2002 | Maroney | |
| 2002/0138393 A1 | 9/2002 | Tatga | |
| 2002/0165817 A1 * | 11/2002 | Rackson et al. .............. | 705/37 |
| 2002/0174060 A1 | 11/2002 | Friedland et al. | |
| 2002/0188545 A1 | 12/2002 | Wiesehuegel et al. | |
| 2003/0028444 A1 | 2/2003 | Kubicek et al. | |
| 2003/0050861 A1 | 3/2003 | Martin et al. | |
| 2003/0083982 A1 | 5/2003 | Fisher et al. | |
| 2003/0083983 A1 | 5/2003 | Fisher et al. | |
| 2003/0088502 A1 | 5/2003 | Fisher et al. | |
| 2003/0088505 A1 | 5/2003 | Fisher et al. | |
| 2003/0088507 A1 | 5/2003 | Fisher et al. | |
| 2003/0088508 A1 | 5/2003 | Fisher et al. | |

FOREIGN PATENT DOCUMENTS

| | | |
|---|---|---|
| WO | WO 98/34187 A1 | 8/1998 |
| WO | WO 00/34899 A1 | 6/2000 |
| WO | WO 01/82191 A2 | 11/2001 |
| WO | WO 02/48931 A2 | 6/2002 |
| WO | WO 03/027806 A2 | 4/2003 |

OTHER PUBLICATIONS

Todd E. Rockoff and Michael Groves, "Design of an Internet-based system for remote Dutch auctions," *Internet Research: Electronic Networking Applications and Policy*, vol. 5, No. 4, 1995, pp. 10-16, MCB University Press, Bradford, West Yorkshire, England.

Fernando Branco, "The design of multidimensional auctions," *Rand Journal of Economics*, Vo. 28, No. 1, Spring 1997, pp. 63-81.

Motty Perry, Elmar Wolfstetter and Shmuel Zamir, "A Seated-Bid Auction that Matches the English Auction," academic paper, May 1999, Hebrew University of Jerusalem and Humboldt University of Berlin.

John Lewell, "New Auction Company is Set To Be Global Player," news article, Aug. 23, 1999, http://news.earthweb.com/bus-news/article.php/142691, Earthwebnews.com.

Steven Pollock and Lisa Hawes (contacts), DoveBid Announces Live Webcast Capabilities for On-Site B2B Asset Auctions, press release, Feb. 22, 2000, DiveBid, Inc., Foster City, California.

Alexandra Peers and George Anders, "Online: Web Auctions Get Haute—Sotheby's Deal Could Shake Art Market," *The Wall Street Journal* (eastern edition), Jun. 17, 1999, p. B1, New York, New York.

Alvin E. Roth and Axel Ockenfels, "Last Minute Bidding and the Rules for Ending Second-Price Auctions: Theory and Evidence from a Natural Experiment on the Internet," Working Paper No. 7729, Jun. 2000, National Bureau of Economic Research, Cambridge, Massachusetts.

Network International, Inc., "NetworkOil Acquires Premier Auctioneers International, Inc.," press release, Aug. 2, 2000, Network International, Inc., www.networkintl.com, Houston, Texas.

Datamation Product Watch, "Auction Broacaster—Include Internet Users in Live Auctions," internet article, Sep. 12, 2000, http://earthweb.com, Jupitermedia Corporation, Darlan, Connecticut.

Ralph and Terry Kovel, *Kovel's Bid, Buy and Sell Online: Basic Auction Information and Tricks of the Trade*, 2001, Three Rivers Press, New York, New York.

Leland Harden and Bob Heymand, *The Auction-App: How Companies Tap the Power of Online Auctions to Maximize Growth*, 2002, McGraw-Hill, New York, New York.

Susan Barber (contact), "Greg Manning Auctions, Inc. Presents the 'Certified Comic Book Sale' Saturday Feb. 4, 2001," press release, Feb. 22, 2001, http://www.gregmanning.com, Greg Manning Auctions, Inc., West Caldwell, New Jersey.

David Christopher Parkes, "Iterative Combinatorial Auctions: Achieving Economic and Computational Efficiency," dissertation, 2001, University of Pennsylvania, Philadelphia, Pennsylvania.

Jonathan Andrews, "Auctions in cyberspace," *CA Magazine*, Dec. 2002, Toronto, Ontario, Canada.

Julia Schindler, "Late Bidding on the Internet," research paper, Mar. 2003, Catholic University, Leuven, Belgium.

* cited by examiner

90 ACUR INTEGRA GS BLACK
LOT NUMBER 00139969

200

210

FACILITY: VALLEJO
EXPECTED SALE DATE: 05/17/02
DESCRIPTION: 90 ACUR INTERA GS BLACK
CURRENT BID: $6,800
BID INCREMENT: $100
LOWEST POSSIBLE BID: $6,900

220

YOUR BID: 225

230

SUBMIT YOUR MAXIMUM BID AND COPART'S <u>BID BUTLER</u> WILL CONTINUOUSLY MONITOR THE AUCTION AND INCREMENTALLY RAISE YOUR CURRENT BID TO BEAT FUTURE BIDDERS. BID BUTLER WILL ONLY RAISE YOUR CURRENT BID UP TO YOUR MAXIMUM BID WHEN A HIGHER BIDDER HAS OUTBID YOUR CURRENT BID, NOT YOUR MAXIMUM BID. ALSO, IF YOU HOLD THE HIGHEST MAXIMUM BID AT VB2 AUCTION TIME, YOUR CURRENT BID WILL BE USED AS THE STARTING BID FOR VB2.

SUBMITTED 235

ONLINE BIDDING SYSTEM

CROSS REFERENCE TO RELATED APPLICATIONS

This application claims the benefit of provisional Application No. 60/479,716, filed Jun. 18, 2003.

FIELD OF THE INVENTION

The embodiments of the present invention relate to an auction facilitated by a computer network. More particularly, a global computer network that provides a framework for implementing a unique auction system.

BACKGROUND

The Internet is the most-widely recognizable global computer network in existence. The computers of the Internet are linked via globally unique address space called Internet Protocol (IP) addresses. Since its explosion in the early 1990s, the Internet has enhanced the prosperity of businesses related to everything from gaming to music to retail sales. In fact, as more and more people have gained access to the Internet and have learned to effectively navigate the Internet, Internet sales have continued to increase at an incredible rate. One extremely successful online business venture has been the advent of the online auction.

For their part, online auctions have reduced auctioneer fraud and collusion between a live auctioneer and live bidders. In addition, online auctions are limitless in their scope. Because of their ease of use, online auctions attract millions of sellers and buyers each and every day for the sole purpose of auctioning off and buying goods. Clearly, live auctions of such a scale are not realistic where bidders must be physically present.

Traditionally, live auctions utilize a format whereby items put up for bid are placed on an auction sale list. Thereafter, the listed items are auctioned consecutively at a preestablished date and time. When the live auction begins, one listed item at a time is auctioned off until no items remain. The auction on individual items ends when no further bids are submitted.

In contrast, typical online auctions allow for multiple items to be auctioned simultaneously. The start and finish time for the online auction items is independent from the other items being auctioned. Additionally, online auctions end at a preestablished time rather than when no further bids are submitted.

Even though the recognized auction websites are very successful, the current online auction format is slow, cumbersome and frequently inefficient in garnering a maximum sales price for the items being auctioned. By way of one example, typical online auctions allow sellers to auction items for a preestablished duration of time (e.g. 5 days). When bidders go online to access and view a particular item of interest, they are provided a record of the time remaining until the auction ends. As people bid for a particular item, they can only hope that another bidder does not bid so close to the end of the auction that it is then impossible for the original bidder to place another bid. Of course, under the existing online auction format such intentional late bidding is a frequent and planned occurrence. Moreover, this online auction format does not encourage any true bidding "frenzy" until the last few minutes of the auction. Unfortunately, for sellers this online auction format does not always result in a bidding environment that allows the seller to maximize the sales price of their item up for auction. In otherwords, just as the bidding "frenzy" has started, the bidding is routinely terminated according to the preestablished time set for the auction's expiration.

Therefore, there is a need for an online auction system that provides sellers with a legitimate opportunity to maximize returns, while retaining the inherent benefits for both sellers and buyers of conventional online auction systems.

SUMMARY

Accordingly, the embodiments of the present invention provide a preestablished time duration during which online bidders may bid on presented items simultaneously (hereinafter referred to as "preliminary bidding"). However, the duration of time acts as a countdown to a beginning of a virtual auction rather than a countdown associated with an end of the auction. The preliminary bidding portion of the auction allows online bidders to view all items being sold and to place bids in a manner analogous to current online auction sites. However, once the preliminary bidding portion ends, the virtual or dynamic auction portion begins and is conducted in a fashion analogous to a traditional live auction (hereinafter referred to as "virtual auction"). Therefore, during the virtual auction portion items are auctioned in a consecutive fashion.

The initial bid for the virtual auction is the final high bid obtained from the preliminary bidding portion. Once the virtual auction begins, online bidders may continue to submit bids until no further bids are forthcoming. For example, if an item up for bid as part of the preliminary bidding portion ends with a current high bid of $500, the virtual auction portion opens with a beginning bid of $500. Bidders are then provided the opportunity to input a higher bid within a preestablished time period (e.g. 30 seconds). The difference between a current high bid and any new bid submitted may also need to meet a preestablished minimum bid increment. In other words, new bids may be required to be at least a minimum amount of money (e.g. $5 or $100) more than the existing high bid. To encourage a bidding "frenzy" a countdown timer is displayed on each online bidders' screen during the virtual auction. Additionally, words or phrases associated with auctions, such as "going, going, gone", may be displayed on the computer screen and/or audibly available to the online bidders. The virtual auction continues until each item offered during the preliminary bidding portion has been individually auctioned to its conclusion.

Bidders who participate in the preliminary bidding portion have the option of authorizing a computer server to submit bids on their behalf up to a specified maximum amount. In other words, the bidder authorizes the computer server to act as a proxy to submit bids on behalf of the bidder. If the bidder causing a proxy bid to be submitted is the high bidder during the preliminary bidding portion, the computer server will continue to submit higher bids, if necessary, during the virtual auction portion. The system automatically bids for the bidder until the maximum proxy bid is exceeded or the bidding stops at or below the maximum bid amount. The automatic bid feature has been termed "Bid Butler" by the applicant. In a similar manner, the automatic bid feature may also be utilized during the preliminary auction portion.

Online bidders may also request that they be alerted that a particular item is about to become the subject matter of the virtual auction. In this manner, online bidders do not have to pay attention to numerous individual auctions related to items which they do not have an interest. The alert may be in the form of a subtle audible alarm, a telephone call, a flashing PC display, instant messaging or some other notification means. In general, any means for alerting the bidder is applicable.

While disclosed briefly above, the auction system comprises many features and attributes which are disclosed in greater detail below.

DETAILED DESCRIPTION

Figure 1:
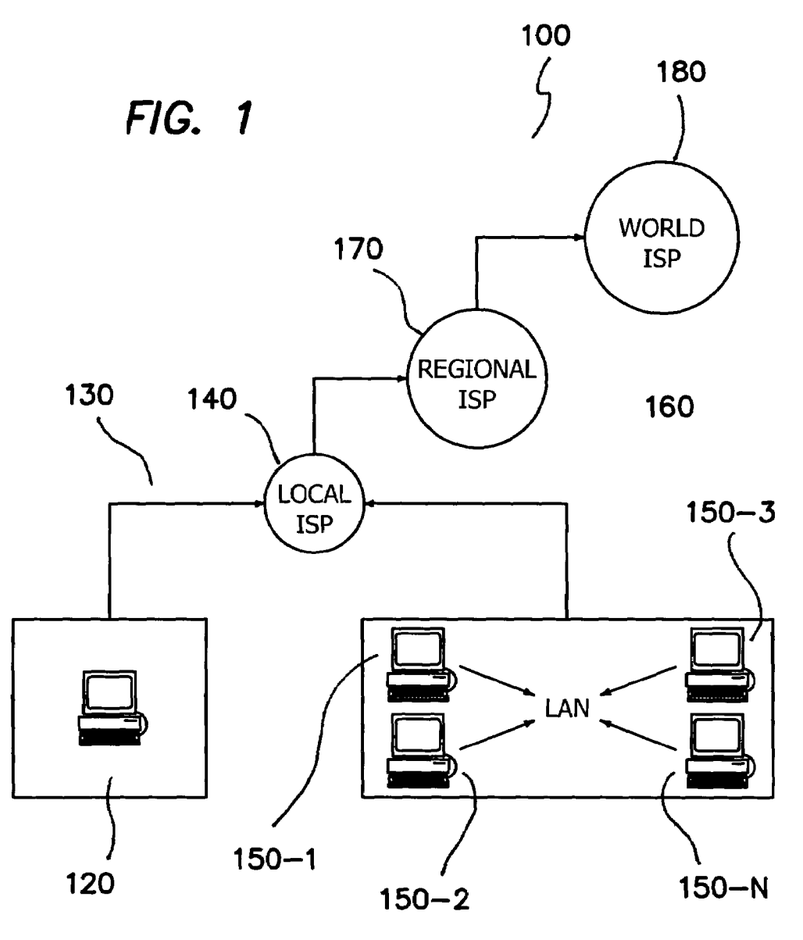
FIG. 1 is an illustration of a conventional global computer network.

Reference is now made to the figures wherein like parts are referred to by like numerals throughout. A conventional global computer network generally depicted as reference numeral 100 includes a plurality of computers linked to one another. The network 100 allows all of the computers to communicate with one another. For example, a home personal computer (PC) 120 may be linked to the network 100 (e.g. the Internet) via a phone-line modem, DSL or cable modem 130 that talks to a local internet service provider (ISP) 140. In a business environment, the business will usually have a network interface card (NIC) that directly connects to a local area network (LAN) inside the business. The LAN comprises a plurality of local computers 150-1 through 150-N. The business can then connect its LAN to the local ISP 140 using a high-speed phone like a T1 line 160.

Each local ISP 140 then connects to a larger regional ISP 170 so that the larger regional ISPs 170 connect a geographic region. The regional ISPs 170 are then connected to even larger ISPs 180 which connect the world. In this way, every computer on the Internet is connected to every other computer on the Internet.

To keep all of the computers straight, each computer on the Internet is assigned a unique address called an Internet Protocol (IP) address. The IP address comprises a string of numbers. Since most people have trouble remembering the strings of numbers that make up an IP address, and since IP address sometimes need to change, all servers on the Internet also have human-readable names. The servers provide services including software applications to user machines (i.e. non-server computers).

The embodiments of the present invention are facilitated by the Internet but do not include altering the Internet as it operates today. Therefore, for the sake of brevity, the minute details of the Internet and its operation are not set forth herein.

In a first embodiment of the present invention, an auction comprises a preliminary bidding component and a virtual auction component. In the preliminary bidding component, online bidders access the IP address/domain name corresponding to a website offering the auction service. Once the bidder has accessed the website, they may be required to register for the auction. The registration process may include the bidder providing personal or business information (e.g. name, address, telephone number, etc.), providing a method of payment (e.g. credit card number, bank account number, etc.) in case the bidder prevails with respect to specific item or items and any other information necessary to implement the online auction, such as a user name and password allocation. Once the registration process is completed the bidder is provided access to items up for bid. It is further envisioned that a registered bidder may be able to access a preliminary auction and a virtual auction by clicking on identified icons or windows displayed on an auction website or website linked to the auction website.

All items offered for bid are assigned to a particular auction date and time and are grouped on a "sale list" with other items assigned to the same date and time. Each item is accompanied by a written description and at least one or more static pictures of the item. Optionally, bidders may view a video type presentation of the item. Alternatively and additionally, bidders may be provided with access to a dynamic picture that may be rotated through 360 degrees allowing a complete view thereof. The specific presentation of the item is based on the preference of the specific website offering the auction. The objective is to provide bidders with a full and complete understanding of the item and its condition so that the bidders may make an educated bid.

During the preliminary bidding portion of the auction, bidders may enter bids on any item contained on the sale list until the preliminary bidding portion ends at a preestablished time. For example, the preliminary bidding portion may last as little as one day, but more often the preliminary bidding portion will last longer (e.g., two weeks) so that bidders can review and enter bids on an item in an open bid format. Preliminary bidding typically ends at some preestablished time prior to the scheduled start time of the virtual auction. A current high bid, along with a minimum required bid increment and lowest possible allowed bid, is displayed for the bidder to review. Thus, during the preliminary bidding portion, bidders are free to input bids on any of the items desired.

During the preliminary bidding portion of the auction, bidders may also input proxy bids. Proxy bids are bids that indicate the bidder is willing, if necessary, to bid up to a maximum amount specified by the bidder. Proxy bids are usually, but not always, a fair amount above the current bid. Therefore, if the current bid is $100, a bidder may input a proxy bid of $250 indicating that the bidder is willing to pay up to $250 to purchase the item. During the preliminary bidding portion of the auction, the website, or more precisely the website server will, on behalf of the bidder who submitted the proxy bid, submit bids in the minimum bid increment (e.g., $10) in response to each higher bid submitted by another bidder. However, the bidder's bid never automatically increases above the $250 proxy bid. In the aforementioned example, the proxy bidder's first bid may be automatically input as $110 (i.e., $10 more than the previous high bid). If another bidder inputs a $120 bid, the server automatically increases the proxy bidder's bid to $130. This procedure continues until a bid exceeds $250, at which time the proxy bidder is eliminated since the bid has exceeded his or her maximum bid amount, or the proxy bidder's input bid, which is less than or equal to $250, causes all other bidders to stop bidding. As described in detail below, regardless of the outcome of the preliminary bidding portion of the auction, the item remains available for auction during the virtual auction portion. In otherwords, the item has not been sold. If in the same example, the preliminary bidding ends at 4200 and the proxy bidder is the high bidder, the server will continue to submit proxy bids, not to exceed 4250, on behalf of the bidder during the virtual auction.

Figure 2:
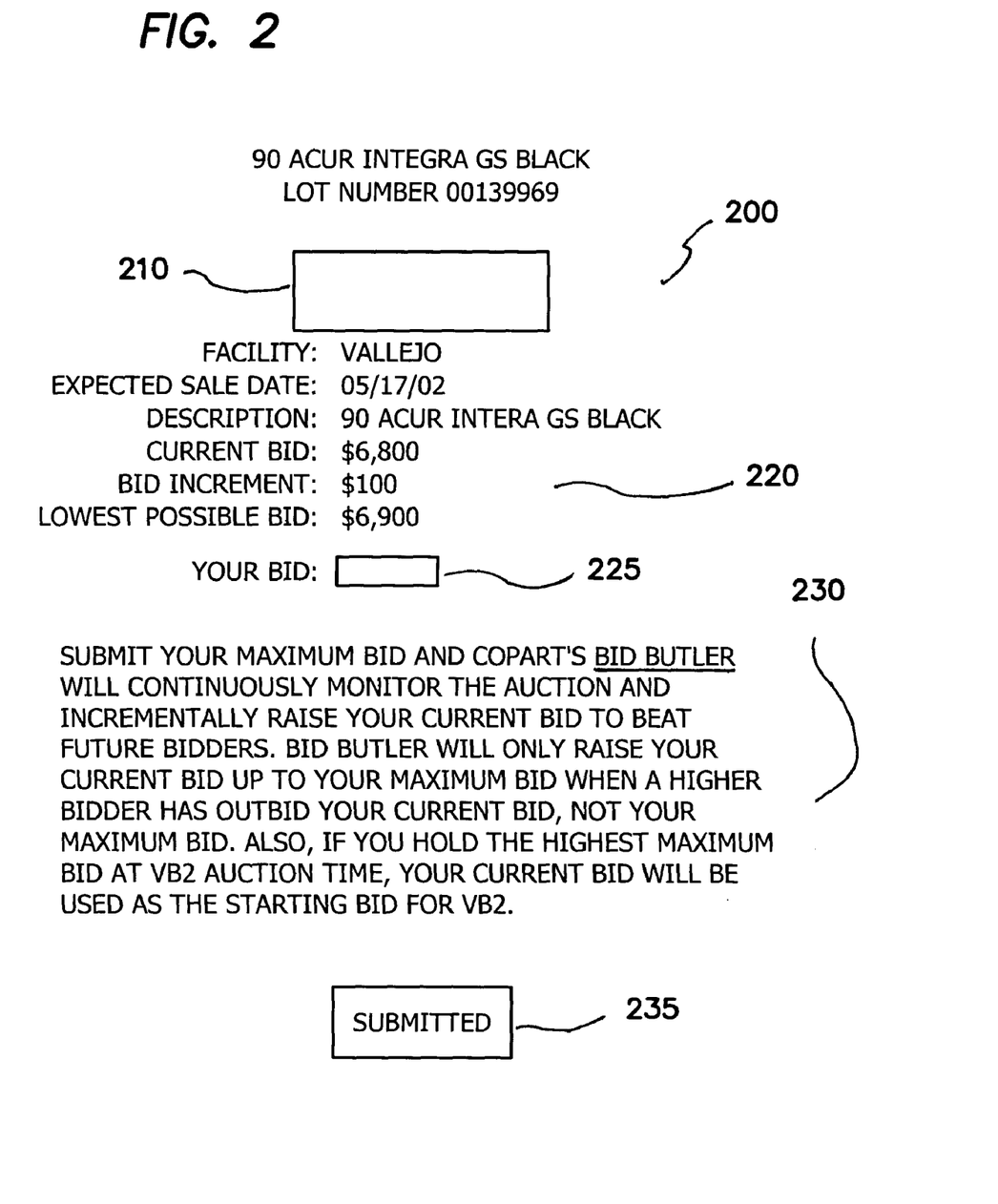
FIG. 2 is an illustration of a bidder screen accessed during a preliminary auction portion of the embodiments of the auction system.

Now referring to FIG. 2, a bidder screen 200 accessed during a preliminary bidding portion of the embodiments of auction system is shown. It is noted that the bidder screen 200 is probably not the first screen that online bidders will see when they access a website offering the auction. In most instances, the first page is likely an auction company screen that provides bidders and other online users with information related to the auction company and links to other materials of interest, including sale lists. Also, the first page includes a link to the bidder screen 200 or an indirect link reachable by first viewing a sale list or some other method of locating the desired items for viewing and bidding.

In a first embodiment, the bidder screen 200 is accessible only after the aforementioned registration process has been completed and after the item has been selected from the auction sale list of has otherwise been located through various search functions provided on the website. Ideally, to access the bidder screen 200, the bidder must input the username and password selected during the registration process. The screen 200 includes item pictures 210, a written description of the item 220, a bid entry window 225 and a submit bid icon 230. The screen also includes instructions 235 regarding the Bid Butler. The Bid Butler monitors the auction and increments a bidder's bid pursuant to a maximum input bid. Thus, once the Bid Butler reaches the bidder's maximum bid, the Bid Butler stops placing incremental bids for the bidder. The screen may also display a countdown timer (not shown) displaying the amount of time remaining for the preliminary bidding portion of the auction and a time window (not shown) for showing a start time of the virtual auction portion. Alternatively, a proxy bid window for allowing bidders to place proxy bids may be displayed on screen 200. Optionally, the screen 200 may also include an icon for rotating the item pictures 210 or an icon for playing a streaming video depiction of the item being auctioned. The screen may also display a bid log for displaying the preliminary bidding history as explained, with respect to the virtual auction portion, in more detail below.

The bid entry window 225 allows bidders to enter bids. The bid entry window 225 treat bids in excess of the next bid increment as proxy bids. For example, if the current high bid is $500 by a first bidder and the minimum required bid increment is $50, the next bid should be $550. However, if a second bidder decides to enter a bid of $1000, the bid is treated as a proxy bid. Thus, the current high bid is set at $550 and credited to the second bidder. If the first bidder then bids $600, the system automatically increases the second bidder's bid to $650. This continues until the second bidder is the high bidder with no further bids forthcoming or until the second bidder's $1000 bid is exceeded. Thereafter, if desired, the second bidder may enter another bid or series of bids.

The length of time of the preliminary bidding portion of the auction is determined by the entity or individual controlling the website offering the auction. It is contemplated that the length of time should be in terms of days to permit the items to be viewed and studied by all interested parties. Nonetheless, there are no explicit time frame parameters.

The operations of the website (i.e., the countdown timer, the rotation of the pictures, access to various screens, etc.) offering the embodiments of the present invention are controlled by a server corresponding to the website. The server provides the software and other computer technology necessary to control the operation of the website and its many features. Since such website operations and corresponding servers are well known in the industry, they do not need to be intimately described herein.

Once the preliminary bidding portion of the auction has ended, no more bids may be input by online bidders. After the end of the preliminary bidding portion of the auction, the virtual portion of the auction is set to begin. Screen 200 includes a start time for the virtual portion of the auction. The time between the end of the preliminary bidding portion and the start of the virtual portion is again determined by the operator of the website offering the auction.

Figure 3A:
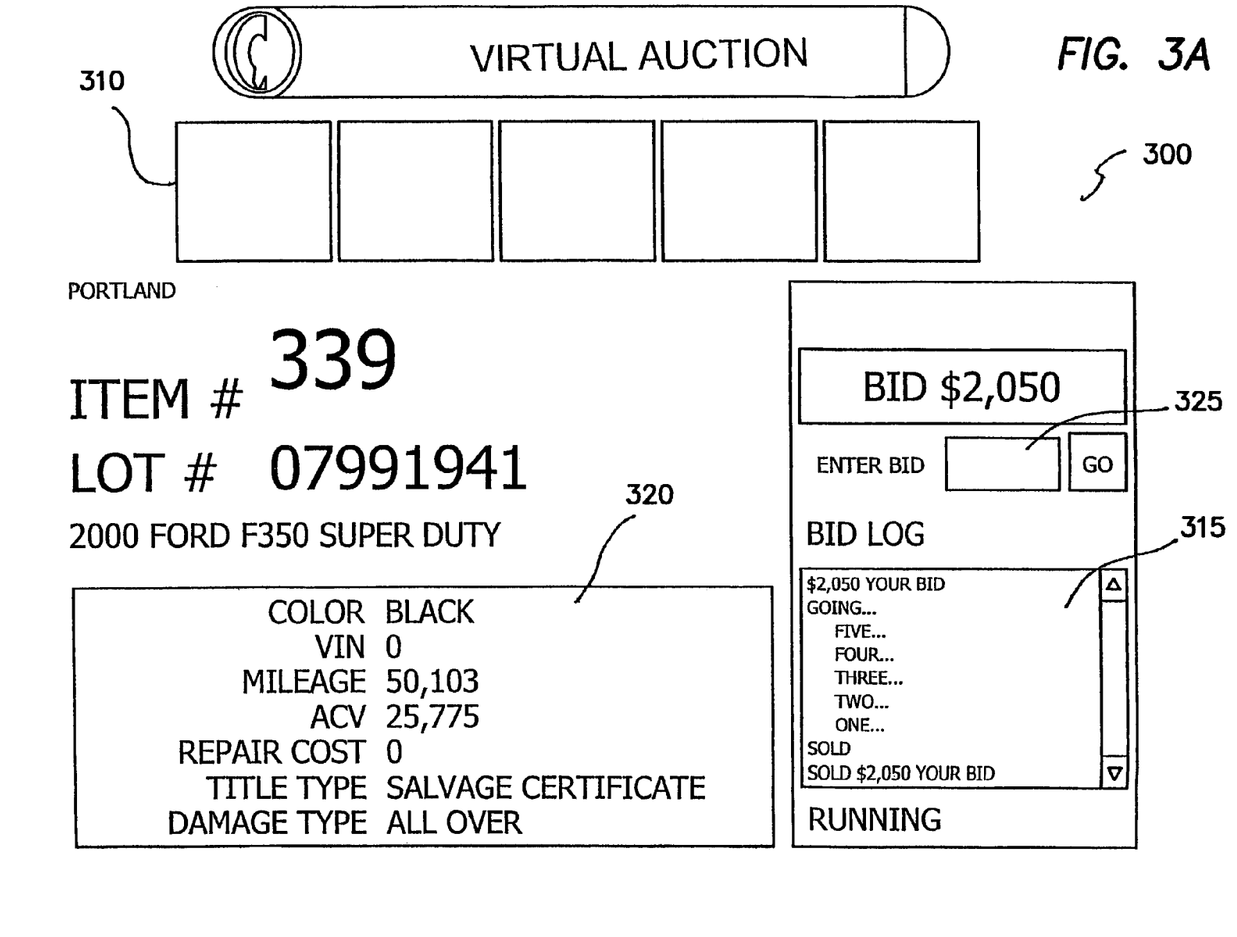
FIG. 3A is an illustration of a bidder screen during a virtual auction portion of the embodiments of the auction system.

Now referring to FIG. 3A, a bidder screen 300 accessed during a virtual auction portion of the embodiments of the auction system is shown. The virtual auction proceeds in a manner analogous to a traditional live auction. In other words, the virtual auction takes place in real time with items being auctioned consecutively. However, unlike a traditional auction, the virtual auction begins with a higher opening bid and the auction time is drastically reduced because of the preliminary auction. However, the website server acts as the auctioneer and controls the auction. Once again, in a first embodiment, bidders need to be registered to gain access the virtual auction screen. If the bidder is already registered, they will only need to input their username and password to access the virtual auction screen 300. Thereafter, each item will be auctioned consecutively and individually until all items have been offered for auction. In practice, as soon as one item has been auctioned, the next item will be offered. The auction is controlled by the website server or similar device.

The virtual auction screen 300 includes item pictures 310, a bid log 315, a written description of the item 320 and a bid entry window 325. The bidding history in the bid log 315 starts with the current bid from the preliminary auction portion which is indicated as the "starting bid." The bid log 315 is the focal point of the virtual auction portion because, as shown in both FIGS. 3A and 3B, it identifies each bid, the location of the corresponding bidder and a countdown sequence to indicate that the item is about to be sold if no further bids are received. For example, as shown in FIG. 3A, the countdown may show Five, Four, Three, Two, One and SOLD to inform bidders that they must submit another bid quickly or lose the item. When any bid is received during the countdown sequence, the countdown ceases and resets a preestablished number of seconds later. If no bids are received during the countdown sequence, the item is sold. If no bids are submitted during the virtual auction portion, the high bidder from the preliminary bidding portion is warded the item as the high bidder. As set forth above, bidders may also need to input a bid that is a preestablished increment (e.g. $5) more than the previous bid. Thereafter, the next item up for auction from the sale list is displayed and the bid log 315 shows the "starting bid".

While the amount of time allotted between bids may remain constant (e.g. thirty seconds), it may also be decreased, as the bidding advances, to minimize the length of the virtual auction. For example, the time between bids may be incrementally decreased to only fifteen seconds should the virtual bidding continue for a preestablished length of time such as three minutes. The decreased amount of time between bids will encourage bidders to input bids that they are confident will prevail. In any event, the time allotted between bids is arbitrary but should be a sufficient time to allow bidders a realistic opportunity to input a new higher bid.

To further encourage a bid "frenzy" the screen 300 may also display words or phrases associated with the virtual auction. For example, as the bid log 315 counts down, the screen 300 may further display the phrase "going, going, gone" to encourage bidders to input additional bids. Alternatively, the words or phrases can be audibly reproduced by the speakers of a networked PC. In this manner, the audible words and phrases have the effect of creating a live auction environment.

Figure 3B:
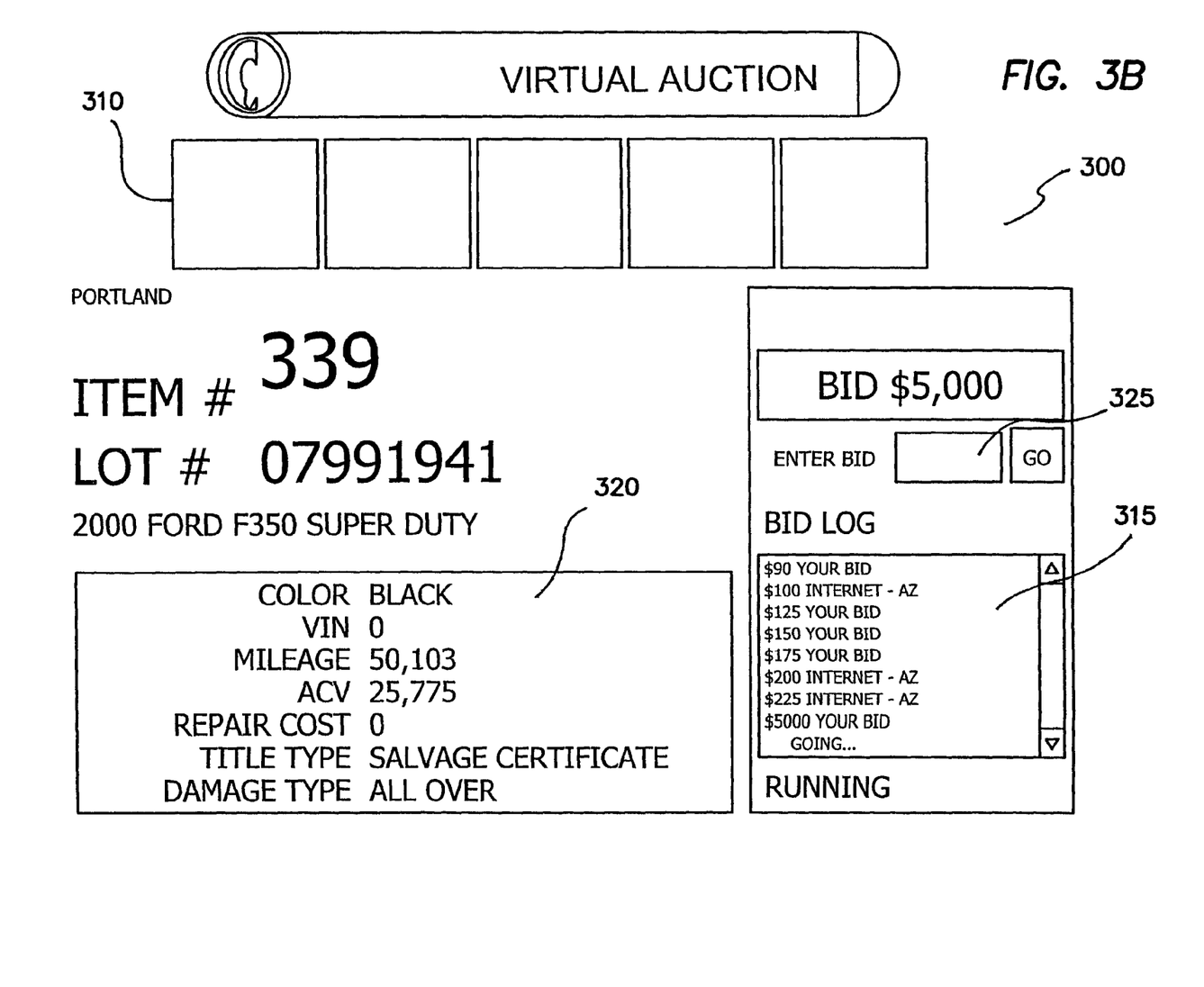
FIG. 3B is another illustration of a bidder screen during a virtual auction portion of the embodiments of the auction system.

It is also contemplated that the geographic location of individual bidders may be displayed or enunciated over the networked computers as shown in FIG. 3B. By providing the geographic location of the bidders, the auction's magnitude is reinforced thereby promoting the concept being offered. In essence, the geographic indicator is free public relations informing the bidders of the mass appeal of the auction site. Thus, one or more bidders may desire to use the website to auction off his or her own goods.

In a first embodiment of the auction system, any unused proxy bid authority remaining from the high bidder of the preliminary bidding portion of the auction is carried over to the virtual auction portion. In the same manner as the preliminary bidding portion, the server acts to automatically input a bid for the proxy bidder until the maximum amount has been reached. Optionally, proxy bidders may instruct the server that proxy bids are not to be carried over to the virtual auction portion. In fact, screen 200 and/or screen 300 may include an icon or window for bidders to decline or accept carrying their proxy bids from the preliminary auction portion to the virtual auction portion. The virtual auction can allow for proxy bids to be submitted during the virtual auction, or in the alternative can treat any submitted bid that is higher than the required minimum bid as a straight bid to be submitted directly into the auction.

In the first embodiment, each item presented during the preliminary auction portion is also presented during the virtual auction portion. Since items are auctioned consecutively during the virtual auction portion, there will be a delay between the start time of the virtual auction portion and the time certain items are offered during the later stages of the virtual auction. Therefore, the embodiments of the present system incorporate a method for providing bidders with notice that a specific item is about to be offered for bid as part of the virtual auction. Screen 200 and/or screen 300 incorporate an identification number entry window for bidders to enter item identification numbers associated with specific items being auctioned. Based on the item identification numbers input by the bidders, the system is instructed that certain bidders are interested in being notified that the certain specific items are about to be offered for bid as part of the virtual auction. As most bidders will be using PCs with corresponding speakers, the bidders may be alerted by an audible alarm indicating that the item of interest is about to be offered for auction. Alternatively, a flashing PC screen, a telephone call, pager alert or instant messaging may be used to alert the bidder. Any suitable manner of notification is contemplated herein.

The timing of said alerts, like the time allowed between bids, is arbitrary but should be enough time to allow bidders to return to their PCs (or other network device) and input bids. For example, the alert may begin five minutes before the item is expected to come up for auction, or alternatively when there are only five items up for bid prior to the auction for the item of interest.

Figure 4:
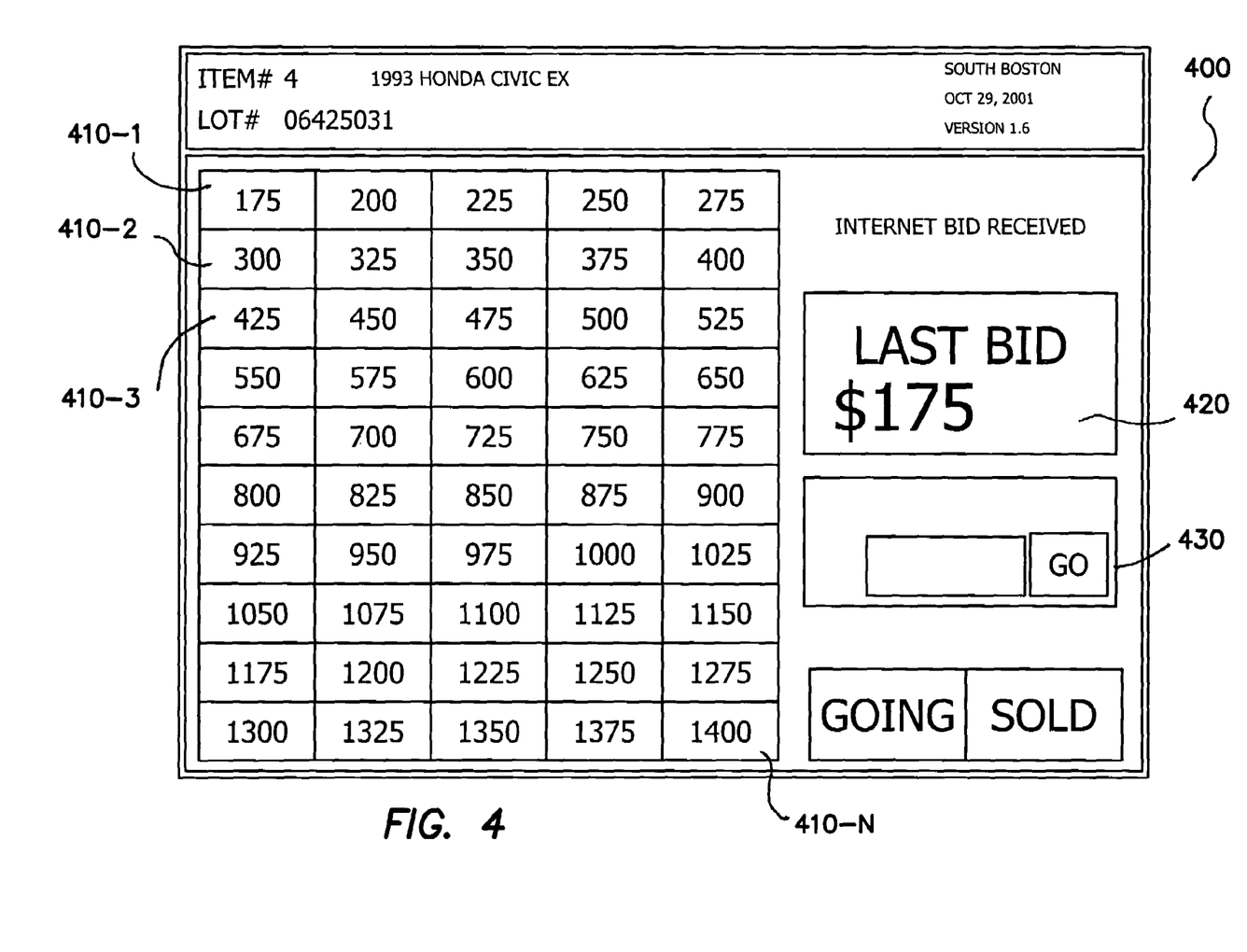
FIG. 4 is an illustration of a bid matrix.

To increase the ease and speed of inputting bids during the virtual auction portion, a bid matrix as shown in FIG. 4 may be incorporated on screen 300. The bid matrix 400 holds a preestablished collection of individual bids 410-1 through 410-N which are incremented in a pre-set format to correspond to the item up for bid. In this manner, the bidder simply clicks on, or moves a displayed indicator icon to, a desired bid causing that bid to be automatically input. Besides the use of a computer mouse or keyboard keys, a touchscreen may also be used to select the desired input bid. The matrix 400 eliminates the need for bidders to input a dollar value of bids which may require three or more key strokes and may lead to errors.

The particular values associated with the individual bids 410-1 through 410-N are a function of the initial virtual auction bid (i.e. the final preliminary auction bid) of the specific item being offered. Moreover, the difference between successive individual bids 410-1 through 410-N is also a function of the initial bid of the specific item being offered. In otherwords, a high priced item may have a larger separation between bids 410-1 through 410-N than a lower priced item. The bid matrices may be, based on a anticipated bid, predetermined for each item being auctioned or may be generated in response to the initial virtual auction bid. Such predetermined matrices are beneficial in situations when a minimum bid has been established such that the matrix 400 of individual bids 410-1 through 410-N can be anticipated. Alternatively, as set forth above, the bid matrix 400 may be generated in response to the initial virtual auction bid. In this manner, a library of pre-generated matrices may be stored on the server or similar storage device prior to the auction and may automatically be retrieved based on the initial virtual auction bid. Alternatively, the bid matrix 400 may be originally generated in response to the initial virtual auction bid by a server application.

Although the invention has been described in detail with reference to a preferred embodiment, additional variations and modifications exist within the scope and spirit of the invention as described and defined.

We claim:

1. A method of selling items over a computer network, said method comprising:

during a preliminary bidding that does not result in sale of an item, providing information about a plurality of items over said computer network and accepting a plurality of increasing preliminary bids for each of said plurality of items, wherein said preliminary bidding for each item continues for a specific set period of time that is included in said information;

closing the preliminary bidding for each of said items upon expiration of said period of time corresponding to that item;

providing results of said preliminary bidding over said computer network such that bidders can select items from among said plurality of items to bid on during a subsequent sale of said plurality of items;

offering each of said items for sale over said computer network, wherein a starting bid for each said item is determined by a highest bid received on that item during said preliminary bidding;

receiving increasing bids for each item until a high bid is determined, wherein that item is sold to a bidder providing said high bid.

2. The method of claim 1, further comprising:

receiving a proxy bid during said preliminary bidding on a said item;

automatically entering a new preliminary bid based on said proxy bid that betters any preliminary bid received on that item tat is lower than said proxy bid; and if said specific period of time expires before a current preliminary bid on said item reaches said proxy bid, entering a new bid during said sale of said item that betters any bid received on tat item that is lower than said proxy bid.

3. The method of claim 1, displaying for each bidder a countdown timer that times a countdown during the sale of a said item, the countdown timer informing each bidder of a time remaining until a current bid for that item is determined to be the high bid for that item.

4. The method of claim 3, further comprising displaying for each bidder the words "going, going, gone," in that sequence, as said countdown elapses.

5. The method of claim 3, wherein said countdown timer resets in response to receipt of a new bid prior to said countdown elapsing.

6. The method of claim 5, wherein said countdown is shortened each time said countdown timer is reset.

7. The method of claim 1, further comprising displaying a current bid for an item being sold during said receiving increasing bids, and displaying with said current bid a geographic location of a bidder who has entered that current bid.

8. The method of claim 1, wherein said specific period of time comprises a number of days.

9. The method of claim 1, further comprising providing a second specific period of time between said closing said preliminary bidding and said offering each of said items for sale such that bidders can review results of said preliminary bidding during said second specific period of time.

10. The method of claim 9, wherein said second specific period of time is determined by a vendor conducting said sale.

11. The method of claim 1, wherein said providing information about said plurality of items is performed such that information about each of said plurality of items is available simultaneously.

12. The method of claim 1, wherein offering each of said items for sale is performed one item at a time.

13. The method of claim 12, further comprising issuing an alert to specific bidders just prior to sale of a specific item from said plurality of items.

14. The method of claim 13, wherein issuing said alert includes generating a communication external to said computer network.

15. The method of claim 1, further comprising displaying a matrix of bid amounts from which a preliminary bidder or a bidder during said sale can select an amount to enter as a preliminary bid during said preliminary bidding or a bid during said sale.

* * * * *